United States Patent Office 3,501,499
Patented Mar. 17, 1970

3,501,499
SULFONYLUREA DERIVATIVES
Erhard Schenker, Basel, Switzerland, assignor to Sandoz Ltd. (also known as Sandoz A.G.,) Basel, Switzerland
No Drawing. Filed Feb. 13, 1967, Ser. No. 615,304
Claims priority, application Switzerland, Feb. 16, 1966, 2,256/66; Sept. 2, 1966, 12,792/66; Oct. 5, 1966, 14,379/66; Nov. 30, 1966, 17,127/66
Int. Cl. C07d 99/04, 41/08
U.S. Cl. 260—340.7          5 Claims

ABSTRACT OF THE DISCLOSURE

The present invention provides heterocyclic sulphonyl-semicarbazide derivatives of formula:

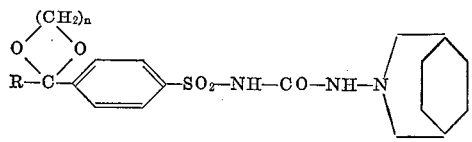

in which R is alkyl of 1 to 3 carbon atoms, and $n$ is 2 or 3, and the alkali metal, alkaline earth metal and ammonium salts thereof.

---

The compounds of the invention exhibit a pronounced blood sugar lowering effect of long duration, and upon administration of low doses, they furthermore lower the content of free fatty acids in the blood.

The production of these compounds is furthermore described:

The present invention relates to new heterocyclic sulphonyl-semicarbazide derivatives and processes for their production.

The present invention provides heterocyclic sulphonyl-semi-carbazide derivatives of Formula I,

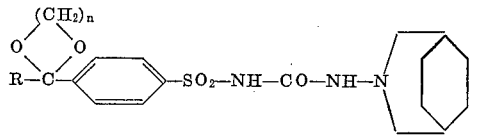 I in which R signifies an alkyl radical having 1 to 3 carbon atoms, and $n$ signifies the number 2 or 3, and their alkali metal, alkaline earth metal and ammonium salts.

The present invention further provides the following two processes for the production of compounds of Formula I and their alkali metal, alkaline earth metal and ammonium salts:

(a) 3-amino-3-azabicyclo[3,2,2]nonane of Formula II

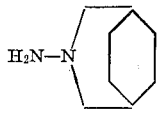 II is reacted with a compound of Formula III,

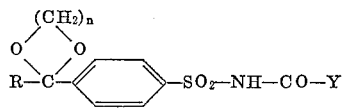 III in which R and $n$ have the above significance, and Y signifies a lower alkoxy or an amino radical, and, when an alkali metal, alkaline earth metal or ammonium salt is required, salification is effected.

(b) A compound of Formula IV,

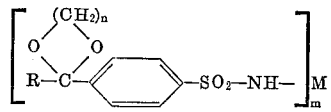 IV in which R and $n$ have the above significance, and M signifies the cation of an alkali metal or alkaline earth metal, and $m$ corresponds to the valency of M,
is reacted with a compound of Formula V,

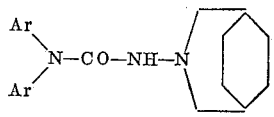 V in which the two symbols Ar signify identical or different aromatic radicals, which may optionally be substituted and which may be linked by a single bond, a methylene or ethylene radical or an oxygen or sulphur atom,
or with a carbodihydrazide of Formula VI,

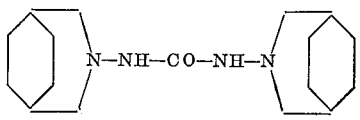 VI or with a compound of Formula X,

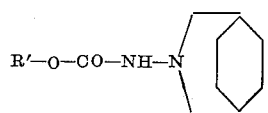 X in which R' signifies an alkyl radical having 1 to 4 carbon atoms, when the free base is desired the resulting compound I is liberated from its alkali metal or alkaline earth metal salt, and, when an alkali metal, alkaline earth metal or ammonium salt is required, salification is effected.

Suitable starting materials of Formula III are the lower alkyl esters, particularly the methyl and ethyl esters of the substituted benzenesulphonyl-carbamic acids or their amides (i.e. benzenesulphonyl-ureas).

The process (a) may, for example, be effected as follows, depending on the starting materials used:

A solution of the compound of Formula II in an anhydrous organic solvent, e.g. absolute benzene, toluene, xylene, dimethyl formamide or acetonitrile, is added to a solution of a benzenesulphonyl-carbamic acid ester of Formula III, e.g. a 4-(2 - methyl-1,3 - dioxan-2-yl)benzenesulphonyl-carbamic acid ethyl ester, in more of the same solvent. The reaction mixture is heated to the boil at reflux for 1 to 6 hours and is then cooled to room temperature. The solvent is removed by decantation, filtration or distillation. The residue, which contains the crude final product, is obtained in pure form by crystallization from a suitable solvent.

The reaction of a compound II with a benzenesulphonyl-carbamic acid ester of Formula III may also be effected without solvent, i.e. by melting.

When benzenesulphonyl-urea derivatives are used as starting materials of Formula III the process is preferably effected by heating a mixture of the benzenesulphonyl-urea derivative and the compound of Formula II, or a salt thereof, e.g. the hydrochloride, in a suitable solvent, e.g. ethyl acetate or acetonitrile, and, if the free base is used, also absolute benzene or 1,2-dimethoxy-ethane, to the boiling temperature of the solvent for 5 to 24 hours, optionally in a stream of nitrogen. After cooling the final product is isolated and purified in manner known per se.

In accordance with the process (b), equimolar quantities of an alkali metal or alkaline earth metal salt, preferably the sodium salt, of a substituted benzenesulphonamide of Formula IV and a semicarbazide of Formula V, eg. 1 - (3 - azabicyclo[3,2,2]non-3-yl)-3,3-diphenyl-urea, are dissolved in a solvent, e.g. dimethyl formamide, and heated to approximately 100° C. in an oil bath. An excess amount of the semicarbazide may, however, also be used. The resulting alkali metal or alkaline earth metal salt of the compound I usually already crystallizes upon cooling and after isolation may be converted into the compound I by acidification. When no crystallization occurs, the solvent may, for example, be reduced to half its volume in a vacuum and water and some alkali added to the residue. The secondary amine which results as by-product may then be removed by extraction with ether or a chlorinated hydrocarbon, e.g. chloroform, and after acidification (e.g. with acetic acid) the desired sulphonyl-semicarbazide may be obtained in pure form. If necessary, the resulting compound may be purified by dissolving in dilute ammonia and precipitating with dilute hydrochloric acid.

When a symmetric carbodihydrazide of Formula VI is used as starting material the process (b) is effected, for example, by heating equimolar amounts of the alkali metal or alkaline earth metal salt, preferably the sodium salt, of the correspondingly substituted sulphonamide of Formula IV and 1,3-bis(3-azabicyclo[3,2,2]non-3-yl)-urea in an open flask. The preferred reaction temperature is between 150° and 200° C. In most cases the resulting melted material already solidifies after a few minutes with the formation of the alkali metal or alkaline earth metal salt of the benzenesulphonyl-semicarbazide, which is converted into the corresponding free compound by dissolving in water and acidifying.

The reaction of the alkali metal or alkaline earth metal salt of the sulphonamide with the carbodihydrazide may, however, also be effected by heating a solution of the two components in a suitable high-boiling solvent (approximately 190° C.), e.g. diethylacetamide, at reflux for 10 to 60 minutes. After cooling, the desired compound may be liberated from the alkali metal salt by acidification and isolated and purified in manner known per se.

When a compound of Formula X is used as starting material, the process (b) is effected, for example, by heating a solution of the alkali metal or alkaline earth metal salt of the sulphonamide of Formula IV and the carbazide of Formula X in a suitable organic solvent such as dimethyl formamide, dimethyl or diethyl acetamide, at a temperature of 40° to 160° C. for 5 to 36 hours. The desired compound I is isolated from the reaction mixture in a manner similar to that described above.

The hitherto unknown heterocyclic sulphonyl-urea derivatives produced in accordance with the invention have valuable pharmacodynamic properties. Thus, in tests effected with animals (rats, dogs) they exhibit a pronounced blood sugar lowering effect of long duration, which occurs even upon administration of low doses. 1-(3-azibicyclo[3,2,2]non - 3 - yl)-3-[4-(2-methyl-1,3-dioxan-2-yl)benzenesulphonyl]urea is especially useful in this respect. When administered in low doses, the compounds furthermore lower the content of free fatty acids in the blood. The compounds are well tolerated and have a low toxicity in comparison with their effectiveness. The compounds of the invention are therefore indicated for use in the treatment of diabetes mellitus and disorders in lipid metabolism, in which case they are preferably administered orally in a daily dose of 50 to 500 mg.

In order to produce suitable medicinal preparations the compounds are worked up with the usual inorganic or organic adjuvants which are inert and physiologically acceptable. Suitable medicinal preparations are, for example, tablets, dragées, capsules, syrups, injectable solutions. Aside from adjuvants, e.g. polyvinyl pyrrolidone, methyl cellulose, talcum, magnesium stearate, stearic acid and sorbic acid, the preparations may contain suitable preserving agents, sweetening and colouring substances and flavourings.

Example of a galenical preparation:                    Tablets, g.
1 - (3 - azabicyclo[3,2,2]non - 3 - yl) - 3 -
    [4 - (2 - methyl - 1,3 - dioxan -2 - yl)ben-
    zene-sulphonyl]urea _____  0.100
Magnesium stearate _____  0.0010
Polyvinyl pyrrolidone _____  0.0040
Talcum _____  0.0050
Maize starch _____  0.010
Lactose _____  0.038
Dimethyl silicone oil _____  0.0005
Polyethylene glycol 6000 _____  0.0015

For a tablet of _____  0.160

The 3-amino-3-azabicyclo[3,2,2]nonane of Formula II used as starting material is new and may be produced by reacting 3-azabicyclo[3,2,2]nonane with sodium nitrite in aqueous mineral acid solution, e.g. in aqueous sulphuric acid solution, in the cold, isolating the nitroso compound from the reaction mixture and purifying it by crystallization and subsequently reducing the nitroso compound. The reduction of the nitroso radical to the amino radical may be effected with zinc in glacial acetic acid or formic acid in the presence of a catalytical amount of a mercury-II salt, e.g. mercury-II chloride, with lithium aluminium hydride in diethyl ether or tetrahydrofuran or with sodium amalgam in water or ethanol in manner known per se.

The benzenesulphonyl-carbamic acid and benzenesulphonyl-urea derivatives of Formula III used as starting materials are also new and together with the process for their production, also form part of the present invention. They may be obtained from the benzenesulphonamides of Formula VII,

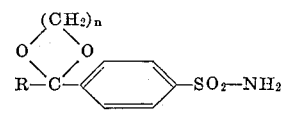

in which R and $n$ have the above significance, which are also new, and which, together with the process for their production, also form part of the present invention.

The sulphonyl-carbamic acid esters of Formula III (Y=alkoxy), e.g. 4-(2-methyl-1,3-dioxolan-2-yl)benzenesulphonyl-carbamic acid ethyl ester, are obtained, for example, in that the correspondly substituted benzenesulphonamide of Formula VII is heated to 40–70° C. for 5 to 18 hours with a chloroformic acid alkyl ester in a suitable organic solvent, e.g. acetone, in the presence of an alkaline condensation agent, e.g. sodium or potassium carbonate. The compound which precipitates from the cooled reaction mixture is subsequently dissolved in water and the aqueous solution is weakly acidified with a mineral acid, e.g. dilute hydrochloride acid, whereupon the desired benzenesulphonyl-carbamic acid ester precipitates and is isolated by filtration and subsequently purified, e.g. by crystallization.

The benzenesulphonyl-ureas (Formula III, Y=amino) may, for example, be obtained as follows:

The corresponding sulphonamide of Formula VII is heated for 4 to 6 hours with an alkali metal cyanate in aqueous alcoholic solution, the precipitated alkali metal salt is subsequently filtered off from the cooled reaction mixture, is dissolved in a small amount of water, the aqueous solution is weakly acidified with a dilute mineral acid, e.g. dilute hydrochloric acid, and the benzenesulphonyl-urea derivative is isolated therefrom in manner known per se.

The benzenesulphonyl-ureas may also be obtained by heating an alkali metal or alkaline earth metal salt of the corresponding sulphonamide (compounds of Formula IV) and urea in a high-boiling solvent, e.g. benzyl alcohol, to 120–180° C. The desired urea compound precipitates by acidifying the cooled reaction solution.

The benzenesulphonamides of Formula VII, in which R and $n$ have the above significance, may be obtained by heating a solution of a lower 4-acylbenzenesulphonamide of Formula VIII,

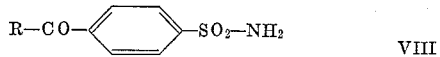

in which R has the above significance, e.g. 4-acetyl- or 4-propionyl-benzenesulphonamide, in ethylene glycol or 1,3-propanediol to approximately 65–90° C. whilst stirring, with the addition of orthoformic acid trimethyl or triethyl ester and in the presence of an acid reacting catalyst, e.g. p-toluene-sulphonic acid, boron trifluoride etherate or potassium hydrogen sulphate, whereby the volatile portions are simultaneously removed by distillation. After heating the reaction mixture to approximately 130° whilst stirring for a further 1 to 2 hours, the desired benzenesulphonamide is isolated from the reaction mixture and purified in manner known per se.

The compounds of Formula V used as starting materials are also new. They may be obtained from the corresponding carbamoyl halides of Formula IX,

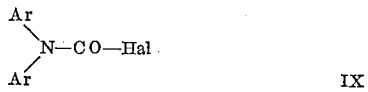

in which Ar has the above significance, and Hal signifies a chlorine or bromine atom, and the compound of Formula II. The two compounds are, for example, heated in a water bath for one hour in aqueous alcoholic solution or in an organic solvent, e.g. 1,2-dimethoxy-ethane or dimethyl formamide, in the presence of an acid binding agent, e.g. sodium or potassium carbonate or bicarbonate, or an additional equivalent of the compound II, or the solution is stirred at room temperature for several hours. The desired semicarbazides may be isolated and purified in manner known per se.

The compounds of Formulas VI and X are also new, and together with the process for their production, also form part of the present invention. They may be produced by reacting the compound of Formula II with a chloroformic ($C_1$–$C_4$) acid ester and the resulting compound of Formula X is reacted with a further mol of compound II by melting the reactants at approximately 150° or by heating in boiling xylene for 24 to 72 hours. The reaction with the chloroformic acid ester is effected at room temperature in an inert organic solvent, e.g. 1,2-dimethoxy-ethane, and in the presence of an acid binding agent, e.g. a second mol of compound II or one mol of potassium carbonate.

The term "in manner known per se" as used herein designates methods in use or described in the literature on the subject.

In the following non-limitative examples all temperatures are indicated in degrees centigrade and are uncorrected.

EXAMPLE 1

1-(3-azabicyclo[3,2,2]non-3-yl)-3-[4-(2 - methyl - 1,3 - dioxolan-2-yl)benzenesulphonyl]urea A solution of 19.0 g. of 4-(2-methyl-1,3-dioxolan-2-yl)-benzenesulphonyl-carbamic acid ethyl ester and 8.4 g. of 3-amino-3-azabicyclo[3,2,2]nonane hydrate in 60 ml. of benzene is heated to the boil at reflux whilst stirring for 5 hours. The crude product obtained upon cooling the reaction solution is filtered off and recrystallized from carbon tetrachloride. The compound indicated in the heading has a melting point of 190–192°. *Sodium salt:* 12.0 g. of 1-(3-azabicyclo[3,2,2]non-3-yl)-3-[4-(2-methyl-1,3 - dioxolan-2-yl)benzenesulphonyl]urea are dissolved in 420 ml. of methanol whilst heating slightly. A filtered solution of 1.35 g. of sodium hydroxide in 120 ml. of methanol is added to this solution. After 1 to 2 hours the precipitated sodium salt is filtered off and washed four times, each time with 100 ml. of ethanol/ether (1:1). After drying in a high vacuum over phosphorus pentoxide the analytically pure compound is obtained.

The compounds used as starting materials are produced as follows:

(A) 3-amino-3-azabicyclo[3,2,2]nonane (a) 3-nitroso - 3 - azabicyclo[3,2,2]nonane.—30 ml. of aqueous 50% sulphuric acid are slowly added at 2–5° whilst stirring and cooling to a suspension of 25.0 g. of 3-azabicyclo[3,2,2]nonane in 170 ml. of water, whereby the material does not dissolve completely. An ice cooled solution of 55.3 g. of sodium nitrite in 80 ml. of water is subsequently added at 0° to +3° to this suspension whilst stirring during the course of 2 to 2½ hours. Stirring is continued for 30 minutes whilst cooling and the mixture is allowed to stand over night. The resulting solid material is filtered and subsequently dissolved in ether. After drying the ether solution over sodium sulphate and evaporating the solvent, the residue is recrystallized from n-hexane. 3 - nitroso - 3 - azabicyclo[3,2,2]nonane, having a melting point of 161–164°, is obtained as a yellowish compound.

(b) 3 - amino-3 - azabicyclo[3,2,2]nonane.—18.1 g. of 3-nitroso-3-azabicyclo[3,2,2]nonane are dissolved in 200 ml. of methanol, the solution is cooled to −7° and 60 g. of zinc dust and 105 ml. of glacial acetic acid are aded portionwise to this solution during the course of 4 hours. After the addition has been completed, stirring is continued for 3 hours at room temperature, the insoluble material is then filtered off and the clear filtrate concentrated to a mash. The residue is made alkaline with 350 ml. of aqueous 40% sodium hydroxide and the viscous solution is extracted thrice with 500 ml. of ether. The combined ether extracts are dried over sodium sulphate and concentrated to a mash. This mash is dissolved in absolute ethanol and heated on a water bath for a short time with a molar quantity of citric acid, whereby the crude citrate already crystallizes whilst hot. After recrystallization from methanol the citrate has a melting point of 170–172° (decomposition). The base is obtained in that the citrate is dissolved in water, made alkaline with the concentrated sodium hydroxide and the resulting base is subsequently extracted with ether. Melting point 75–77° from n-hexane.

(B) 4-(2-methyl-1,3-dioxolan-2-yl)benzenesulphonyl-carbamic acid ethyl ester (a) 2 - methyl - 2 - (4 - sulphonamidophenyl) - 1,3-dioxolane.—A solution of 100 g. of 4-acetylbenzene-sulphonic acid amide, 112 g. of ethylene glycol, 178.2 g. of orthoformic acid triethyl ester and 2.5 g. of p-toluenesulphonic acid is heated to 90° in an oil bath whilst stirring for one hour, whereby the volatile portions are simultaneously removed by distillation. After stirring at an oil bath temperature of 130° for a further 1½ hours the reaction solution is concentrated in a vacuum and the resulting mashy residue is recrystallized from ethylene chloride. 4 - (2-methyl - 1,3 - dioxolan - 2 - yl)benzene-sulphonamide has a melting point of 126–128°.

(b) 4 - (2-methyl - 1,3 - dioxolan - 2 - yl)benzene-sulphonyl-carbamic acid ethyl ester.—119 g. of chloroformic acid ethyl ester are added dropwise at room temperature whilst stirring during the course of 1 hour and 45 minutes to a suspension of 178.3 g. of 2-methyl-2-(4-sulphonamidophenyl)-1,3-dioxolane and 278 g. of potassium carbonate in 3.1 litres of dry acetone and the mixture is then heated to the boil at reflux whilst stirring for 18 hours. The cooled reaction product is subsequently filtered, the filter residue dissolved in ice water, the solution acidified whilst stirring with 270 ml. of concentrated hydrochloric acid and extracted with 900 ml. of chloroform. The chloroform extract is washed twice with water, each time with 150 ml., is dried over sodium sulphate and filtered. After concentrating the filtrate the resulting semi-crystalline material is recrystallized from carbon tetrachloride. 4 - (2-methyl - 1,3 - dioxolan-2-yl)-benzenesulphonyl-carbamic acid ethyl ester has a melting point of 88–90°.

EXAMPLE 2

1-(3-azabicyclo[3,2,2]non-3-yl)-3-[4-(2-methyl-1,3-dioxan-2-yl)benzenesulphonyl]urea A solution of 16.5 g. of 4-(2-methyl-1,3-dioxan-2-yl)-benzenesulphonyl-carbamic acid ethyl ester and 7.7 g. of 3-amino-3-azabicyclo[3,2,2]nonane hydrate in 60 ml. of benzene is heated to the boil at reflux whilst stirring for 3 hours. The solution is concentrated to an oil in a vacuum and the oily residue crystallized from ethyl acetate. The compound indicated in the heading has a melting point of 178–180° (decomposition).

The 4 - (2 - methyl - 1,3 - dioxan - 2 - yl)benzene-sulphonylcarbamic acid ethyl ester used as starting material is produced as follows:

(a) 4 - (2 - methyl - 1,3 - dioxan - 2 - yl)benzene-sulphonamide.—A solution of 19.9 g. of 4-acetylbenzene-sulphonamide, 23.1 g. of 1,3-propanediol, 35.6 g. of orthoformic acid triethyl ester and 0.5 g. of p-toluenesulphonic acid is heated to 90° in an oil bath whilst stirring for one hour, whereby the ethanol is simultaneously removed by distillation. After stirring at an oil bath temperature of 130° for a further 1½ hours, the reaction solution is concentrated in a vacuum and the resulting oil crystallized from ethylene chloride. 4-(2-methyl-1,3-dioxan-2-yl)benzenesulphonamide has a melting point of 175–177° (decomposition).

(b) 4 - (2 - methyl - 1,3 - dioxan - 2 - yl)benzene-sulphonyl-carbamic acid ethyl ester.—17 g. of chloroformic acid ethyl ester are added dropwise at room temperature whilst stirring during the course of 1½ hours to a suspension of 25.7 g. of 4-(2-methyl-1,3-dioxan-2-yl)-benzenesulphonamide and 38 g. of potassium carbonate in 400 ml. of dry acetone and the mixture is heated to the boil at reflux for 18 hours. The cooled reaction mixture is subsequently filtered, the filter residue is dissolved in ice water, the solution is acidified with concentrated hydrochloric acid whilst stirring and extracted with chloroform. The chloroform extract is washed twice with water, dried over sodium sulphate and filtered. After concentrating the filtrate, the resulting oily residue is crystallized from ether. The desired carbamic acid ester has a melting point of 94–97°.

EXAMPLE 3

1-(3-azabicyclo[3,2,2]non-3-yl)-3-]4-(2-methyl-1,3-dioxan-2-yl)benzenesulphonyl]urea A suspension of 57.0 g. of 4-(2-methyl-1,3-dioxan-2-yl)-benzenesulphonyl urea and 30.8 g. of 3-amino-3-azabicyclo[3,2,2]nonane hydrate in 300 ml. of ethyl acetatae is heated to the boil at reflux at a bath temperature of 100–100° whilst stirring for 16 hours. The reaction mixture is cooled at 10° and filtered. The filter residue is washed with 75 ml. of diethyl ether and subsequently dried in a vacuum for 3 hours. The resulting analytically pure reaction product has a melting point of 181–183° (decomposition). The compound may be recrystallized from ethyl acetate. Melting point 181–183° (decomposition).

The 4 - (2 - methyl - 1,3 - dioxan - 2-yl)benzenesulphonyl urea used as starting material may be produced as follows:

257.0 g. of 4-(2-methyl-1,3-dioxan-2-yl)benzenesulphonamide and 113.4 g. of potassium cyanate are heated at reflux at a bath temperature of 110° in 1000 ml. of absolute ethanol whilst stirring for 7½ hours. The thick mash is cooled and the solid material filtered off. The dried residue, the potassium salt of the urea, is dissolved in 1.5 litres of ice water and weakly acidified (pH 4–5) with 200 ml. of dilute hydrochloric acid (1:1) whilst adding ice to the solution, stirring and cooling externally with ice. The precipitated product is filtered off, washed portionwise with 1000 ml. of water and the moist product is dissolved in 3000 ml. of ethyl acetate. The weakly acid water portion is separated, the ethyl acetate solution washed in 3 portions with a total of 600 ml. of water, dried over sodium sulphate and concentrated in a vacuum to a crystalline residue. The crude product is recrystallized from acetonitrile, whereby the analytically pure compound, having a melting point of 170–172° (decomposition), is obtained.

EXAMPLE 4

1-(3-azabicyclo[3,2,2]non-3-yl)-3-[4-(2-methyl-1,3-dioxan-2-yl)benzenesulphonyl]urea 14.0 g. of the sodium salt of 4-(2-methyl-1,3-dioxan-2-yl)benzenesulphonamide and 16.7 g. of 1,1-diphenyl-3-(3-azabicyclo[3,2,2]non-3-yl)urea are heated to 100° in 100 ml. of dimethyl formamide for one hour. The suspension is subsequently concentrated by evaporation in a vacuum and the residue crystallized by the addition of absolute ethanol and ether. The crystalline sodium salt is dissolved in 200 ml. of hot water and acidified to a pH of 4–5 with 10% hydrochloric acid, whereby the reaction product precipitates. It is filtered off, washed with water until neutral and dried in a rotatory evaporator with the addition of benzene. The crude product is recrystallized from ethyl acetate, whereby the compound indicated in the heading, having a melting point of 178–180° (decomposition), is obtained.

The 1,1 - diphenyl-3(3-azabicyclo[3,2,2]non-3-yl)urea used as starting material is produced as follows:

A solution of 76.5 g. of diphenylcarbamoyl chloride in 150 ml. of 1,2-dimethoxy-ethane is added at room temperature whilst stirring during the course of 45 minutes to a suspension of 62.1 g. of potassium carbonate in 320 ml. of 1,2-dimethoxy-ethane in which 42.0 g. of N-amino-3-azabicyclo[3,2,2]nonane hydrate have been dissolved. The suspension is subsequently stirred for a further 4 hours whilst boiling at reflux, cooling and filtration are effected. The filtrate is evaporated to dryness in a vacuum and is divided together with the filter residue between 500 ml. of water and 500 ml. of benzene. The water portion is again extracted twice, each time with 250 ml. of benzene. The benzene portions are successively washed with water, dried over sodium sulphate and concentrated in a vacuum. The residue is first recrystallized twice from acetonitrile and then once from petroleum ether, whereupon analytically pure 1,1 - diphenyl-3(3-azabicyclo[3,2,2]non-3-yl)urea, having a melting point of 165–168° (decomposition), is obtained.

EXAMPLE 5

1-(3-azabicyclo[3,2,2]non-3-yl)-3-[4-(2-n-propyl-1,3-dioxolan-2-yl)benzenesulphonyl]urea A solution of 12.5 g. of 4-(2-n-propyl-1,3-dioxolan-2-yl)benzenesulphonyl urea and 8.4 g. of 3-amino-3-azabicyclo[3,2,2]nonane hydrate in 100 ml. of ethyl acetate is heated to the boil at reflux at a bath temperature of 100–110° whilst stirring for 24 hours. The reaction mixture is cooled to 5° and ether is added thereto, whereupon the crystalline crude product precipitates and is filtered off. The filter residue is recrystallized from ethyl acetate. After recrystallization from ethyl acetate, the analytically pure reaction product has a melting point of 155–157° (decomposition).

The 4-(2-n-propyl-1,3-dioxolan-2-yl)benzenesulphonyl-urea used as starting material may be produced as follows:

(a) 4 - (2-n-propyl-1,3-dioxolan-2-yl)benzenesulphonamide.—A solution of 34.1 g. of 4-(n-butyryl)benzene-sulphonamide, 18.6 g. of ethylene glycol, 26.7 g. of orthoformic acid triethyl ester and 0.15 g. of p-toluenesulphonic acid is heated in an oil bath to 90° whilst stirring for 2 hours, whereby the portions which distil off at this temperature are simultaneously removed. The reaction solution is concentrated in a vacuum and the resulting oil crystallized from isopropanol/petroleum ether (1:1). After recrystallizing once from carbon tetrachloride the analytically pure compound, indicated in the heading and having a melting point of 84–86° (decomposition), is obtained.

(b) 4 - (2-n-propyl-1,3-dioxolan-2-yl)benzenesulphonyl urea.—A suspension of 27.1 g. of 4-(2-n-propyl-1,3-dioxolan-2-yl)benzenesulphonamide and 11.3 g. of potassium cyanate in 100 ml. of absolute ethanol is heated at reflux at a bath temperature of 110° while stirring for 21 hours. The thick mash is cooled and the solid material filtered off. The dried residue, the potassium salt of the desired sulphonyl urea, is dissolved in 250 ml. of water and acidified with 50 ml. of 10% hydrochloric acid whilst adding ice to the solution, stirring and cooling externally with ice. The precipitated product is filtered off, washed portionwise with 200 ml. of water and the moist product is recrystallized from 140 ml. of absolute ethanol, whereby the analytically pure compound, having a melting point of 175–177° (decomposition), is obtained.

EXAMPLE 6

1-(3-azabicyclo[3,2,2]non-3-yl)-3-[4-(2-ethyl-1,3-dioxan-2-yl)benzenesulphonyl]urea A solution of 2.0 g. of 4-(2-ethyl-1,3-dioxan-2-yl)benzenesulphonyl urea and 1.3 g. of 3-amino-3-azabicyclo[3,2,2]nonane hydrate in 25 ml. of ethyl acetate is heated to the boil at reflux at a bath temperature of 100–110° whilst stirring for 22 hours. The reaction mixture is evaporated to dryness in a vacuum, ether is added to the evaporation residue and cooling is effected. The crystalline material is filtered off and recrystallized from absolute ethanol, whereby the analytically pure compound, mentioned in the heading and having a melting point of 152–154° (decomposition), is obtained.

The 4-(2-ethyl-1,3-dioxan-2-yl)benzenesulphonyl urea used as starting material is produced as follows:

(a) 4-(2-ethyl-1,3-dioxan-2-yl)benzenesulphonamide.— A solution of 32.0 g. of 4-propionylbenzenesulphonamide, 24.2 g. of propane-1,3-diol, 26.8 g. of orthoformic acid triethyl ester and 0.15 g. of p-toluenesulphonic acid is heated in an oil bath to 90° whilst stirring for 2 hours, whereby the portions which distil off at this temperature are simultaneously removed. The reaction solution is cooled to 5° and the precipitated material filtered off. The residue is recrystallized from ethylene chloride and yields the analytically pure sulphonamide having a melting point of 132–134°.

(b) 4 - (2 - ethyl - 1,3 - dioxan-2-yl)benzenesulphonyl urea.—A suspension of 26.0 g. of 4-(2-ethyl-1,3-dioxan-2-yl)benzenesulphonamide and 11.3 g. of potassium cyanate in 100 ml. of absolute ethanol is heated at reflux at a bath temperature of 110° whilst stirring for 16 hours. The mash is cooled and the solid material is filtered off. The dried residue is dissolved in 250 ml. of water and weakly acidified with 10% hydrochloric acid whilst adding ice to the solution, stirring and externally cooling with ice. The precipitated product is filtered off, washed with ice water and the moist product recrystallized from absolute ethanol. The analytically pure compound, having a melting point of 161–163° (decomposition), is obtained.

EXAMPLE 7

1-(3-azabicyclo[3,2,2]non-3-yl)-3-[4-(2-ethyl-1,3-dioxan-2-yl)benzenesulphonyl]urea A solution of 10.9 g. of 4-(2-ethyl-1,3-dioxan-2-yl)benzenesulphonyl-carbamic acid ethyl ester and 5.9 g. of 3-amino-3-azabicyclo[3,2,2]nonane hydrate in 75 ml. of benzene is heated to the boil at reflux whilst stirring for 5 hours. The red solution is concentrated to an oil in a vacuum and the oily residue is crystallized after adding 50 ml. of ether and 20 ml. of absolute ethanol. The crude product is filtered off and recrystallized from absolute ethanol. The analytically pure compound, indicated in the heading and having a melting point of 152–154° (decomposition), is obtained.

The 4 - (2 - ethyl-1,3-dioxan-2-yl)benzenesulphonylcarbamic acid ethyl ester used as starting material is produced as follows:

10.2 g. of chloroformic acid ethyl ester are added dropwise whilst stirring during the course of 45 minutes to a suspension of 12.7 g. of 4-(2-ethyl-1,3-dioxan-2-yl)benzenesulphonamide and 13.0 g. of potassium carbonate in 150 ml. of dry acetone and the mixture is subsequently heated for 24 hours. The cooled reaction mixture is filtered off, the filter residue is dissolved in 250 ml. of ice water, the solution is weakly acidified with 10% hydrochloric acid whilst stirring and extraction is effected with ether. The ether portion is washed twice with water, dried over sodium sulphate and filtered. The residue is concentrated to an oil in a vacuum and crystallizes upon standing over night. It is filtered off and recrystallized from carbon tetrachloride, whereby the analytically pure carbamic acid ester, having a melting point of 100–102° (decomposition), is obtained.

EXAMPLE 8

1-(3-azabicyclo[3,2,2]non-3-yl)-3-[4-(2-n-propyl-1,3-dioxolan-2-yl)benzenesulphonyl]urea A solution of 17.2 g. of 4-(2-n-propyl-1,3-dioxolan-2-yl)benzenesulphonyl-carbamic acid ethyl ester and 7.9 g. of 3-amino-3-azabicyclo[3,2,2]nonane hydrate in 100 ml. of benzene is heated to the boil at reflux for 6 hours whilst stirring. The solution is concentrated to an oil in a vacuum and ether is added to the oily residue, whereupon crystallization occurs. The solid material is filtered off and recrystallized from ethyl acetate. Melting point 155–157°.

The 4-(2-n-propyl-1,3-dioxolan-2-yl)benzenesulphonyl-carbamic acid ethyl ester used as starting material is produced as follows:

13.4 g. of chloroformic acid ethyl ester are added dropwise whilst stirring during the course of 45 minutes to a suspension of 22.2 g. of 4-(2-n-propyl-1,3-dioxolan-2-yl)benzenesulphonamide and 1.71 g. of potassium carbonate in 150 ml. of dry acetone and the mixture is subsequently heated for 24 hours. The reaction mixture is cooled and the solid material filtered off. The filter residue is dissolved in 250 ml. of ice water and the solution is weakly acidified with 10% hydrochloric acid whilst cooling. The precipitated, smeary material is extracted with ether, the ether portion is washed with ice water and dried over sodium sulphate. The ether is distilled off, whereby an oil results which crystallizes upon standing for a short time. The solid material is filtered off and the crude product recrystallized from carbon tetrachloride, whereupon the analytically pure carbamic acid ester, having a melting point of 110–112° (decomposition), is obtained.

EXAMPLE 9

1-(3-azabicyclo[3,2,2]non-3-yl)-3-[4-(2-methyl-1,3-dioxan-2-yl)benzenesulphonyl]urea A solution of 5.7 g. of the sodium salt of 4-(2-methyl-1,3-dioxan-2-yl)benzenesulphonamide and 5.7 g. of 1,3-bis(3-azabicyclo[3,2,2]non-3-yl)urea in 150 ml. of diethyl acetamide is heated at reflux at a bath temperature of 190° whilst stirring for 45 minutes. After cooling 150 ml. of ether are added to the reaction solution, whereupon a somewhat smeary material precipitates. This is separated and the filtrate allowed to stand in a refrigerator. After 3 days the precipitated crystalline material is filtered off, taken up in 100 ml. of water, a small amount of undissolved material is filtered off and the clear filtrate is weakly acidified (pH 4–5) with glacial acetic acid. The precipitated material is filtered off and recrystallized from ethyl acetate after drying, whereby the compound indicated in the heading, having a melting point of 178–180° (decomposition), is obtained.

The 1,3-bis(3-azabicyclo[3,2,2]non-3-yl)urea used as starting material is produced as follows:

(a) N-(3-azabicyclo[3,2,2]non-3-yl)carbamic acid ethyl ester.—36.0 g. (31.7 ml.) of chloroformic acid ethyl ester are added dropwise whilst stirring during the course of 30 minutes to a suspension of 42.0 g. of 3-amino-3-azabicyclo[3,2,2]nonane hydrate and 62.1 g. of potassium carbonate in 350 ml. of 1,2-dimethoxy-ethane. The mixture is subsequently heated at reflux at a bath temperature of 110° whilst stirring for 3½ hours. After cooling to 5°, the solid material is filtered off, the filtrate concentrated in a vacuum. The residue crystallizes upon standing. The crude product is filtered off and recrystallized once from n-hexane. The analytically pure compound, having a melting point of 70–72°, is obtained.

(b) 1,3-bis(3-azabicyclo[3,2,2]non-3-yl)urea.—A solution of 15.9 g. of N-(3-azabicyclo[3,2,2]non-3-yl)-carbamic acid ethyl ester and 15.6 g. of 3-amino-3-azabicyclo[3,2,2]-nonane hydrate in 75 ml. of xylene is heated at reflux at a bath temperature of 160° whilst stirring for 72 hours. After cooling the reaction solution is evaporated to dryness. After adding n-hexane to the semi-crystalline residue the crystalline reaction product is obtained. A sample thereof is recrystallized from acetonitrile and yields the analytically pure symmetric urea, mentioned in the heading and having a melting point of 200–202° (decomposition).

EXAMPLE 10

1-(3-azabicyclo[3,2,2]non-3-yl)-3-[4-(2-methyl-1,3-dioxolan-2-yl)benzenesulphonyl]urea The compound mentioned in the heading, having a melting point of 190–192°, is obtained from 5.4 g. of the sodium salt of 4-(2-methyl-1,3-dioxolan-2-yl)benzenesulphonamide and 5.7 g. of 1,3-bis(3-azabicyclo[3,2,2]non-3-yl)urea in 125 ml. of diethyl acetamide, after a reaction time of 45 minutes in a bath of 190° and after recrystallization of the isolated crude product from carbon tetrachloride, in a manner analogous to that described in Example 9.

EXAMPLE 11

1-(3-azabicyclo[3,2,2]non-3-yl)-3-[4-(2-methyl-1,3-dioxan-2-yl)benzenesulphonyl]urea A solution of 2.8 g. of the sodium salt of 4-(2-methyl-1,3-dioxane-2-yl)benzenesulphonamide and 2.1 g. of N-(3-azabicyclo[3,2,2]non-3-yl)carbamic acid ethyl ester in 180 cc. of diethylacetamide is heated for 36 hours while stirring at a temperature of 140°. The reaction solution is concentrated in a vacuum to an oil which is distributed between 100 cc. of water and 100 cc. of ether. The aqueous phase is again extracted with 100 cc. of ether and then acidified with glacial acetic acid to pH 4. The precipitated material is extracted with ethyl acetate, and after rewashing the extract with water, drying over sodium sulphate and concentrating, the crude reaction product is obtained. After recrystallization from ethyl acetate the compound indicated in the heading is obtained having a melting point of 178–180° (decomposition).

EXAMPLE 12

1-(3-azabicyclo[3,2,2]non-3-yl)-3-[4-(2-methyl-1,3-dioxolan-2-yl)benzenesulphonyl]urea In a manner analogous to that described in Example 11, the compound indicated in the heading is obtained from 2.7 g. of the sodium salt of 4-(2-methyl-1,3-dioxolan-2-yl)benzenesulphonamide and 2.1 g. of N-(3-azabicyclo[3,2,2]non-3-yl)carbamic acid ethyl ester in 150 cc. of diethylacetamide after a reaction time of 24 hours at a bath temperature of 140°. Melting point 190–192°.

What is claimed is:

1. A compound selected from the group consisting of a compound of formula:

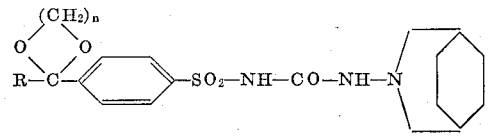

in which R is alkyl of 1 to 3 carbon atoms, and $n$ is 2 or 3, and the alkali metal, alkaline earth metal and ammonium salts thereof.

2. A compound according to claim 1, in which the compound is 1-(3-azabicyclo[3,2,2]non-3-yl)-3-[4-(2-methyl-1,3-dioxolan-2-yl)benzenesulphonyl]urea.

3. A compound according to claim 1, in which the compound is 1-(3-azabicyclo[3,2,2]non-3-yl)-3-[4-(2-methyl-1,3-dioxan-2-yl)benzenesulphonyl]urea.

4. A compound according to claim 1, in which the compound is 1-(3-azabicyclo[3,2,2]non-3-yl)-3-[4-(2-n-propyl-1,3-dioxolan-2-yl)benzenesulphonyl]urea.

5. A compound according to claim 1, in which the compound is 1-(3-azabicyclo[3,2,2]non-3-yl)-3-(2-ethyl-1,3-dioxan-2-yl)benzenesulphonyl]urea.

References Cited

UNITED STATES PATENTS 3,432,491   3/1969   Jucker et al. _____ 260—239

ALTON D. ROLLINS, Primary Examiner

U.S. Cl. X.R.

260—239, 340.9; 424—278